No. 806,853. PATENTED DEC. 12, 1905.
P. H. THOMAS.
MANUFACTURE OF VAPOR ELECTRIC APPARATUS.
APPLICATION FILED FEB. 12, 1904.
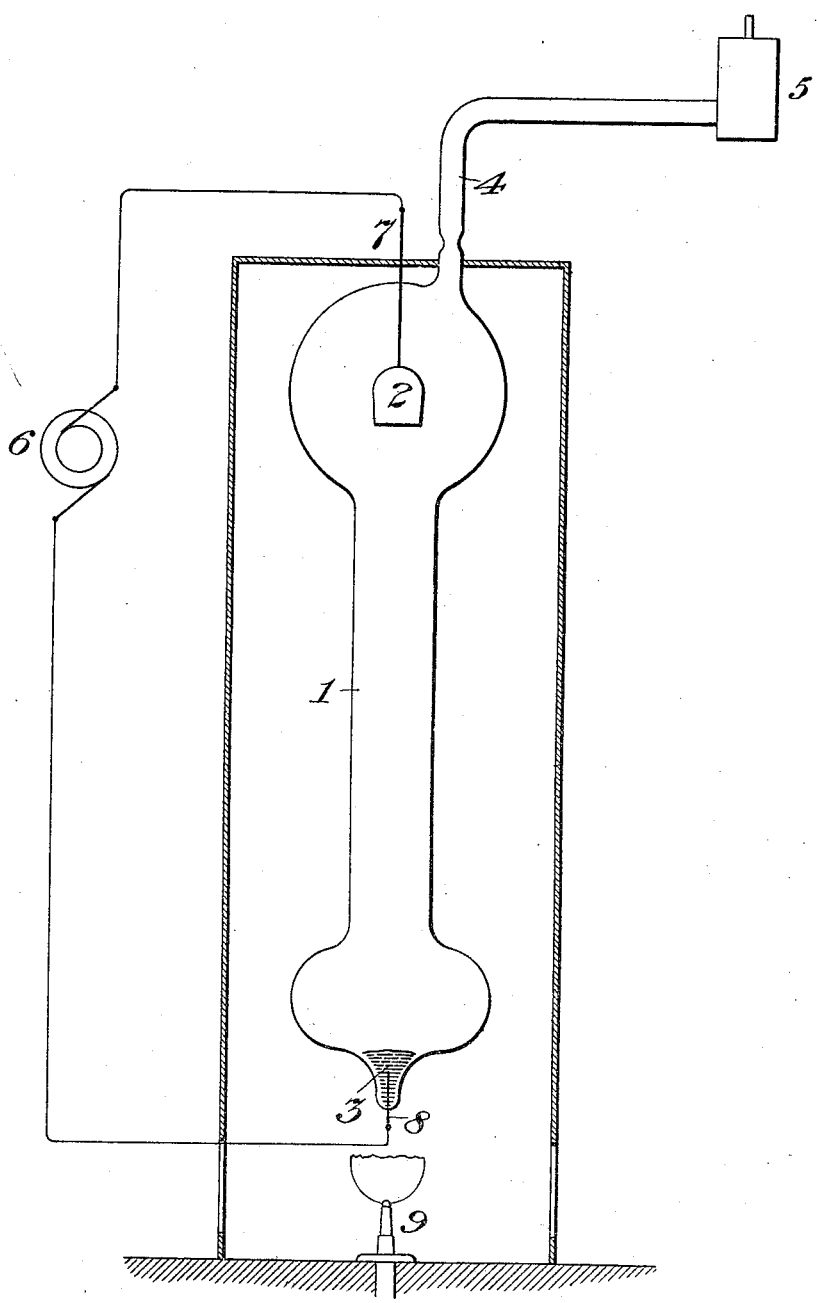

UNITED STATES PATENT OFFICE.

PERCY H. THOMAS, OF EAST ORANGE, NEW JERSEY, ASSIGNOR TO COOPER HEWITT ELECTRIC COMPANY, OF NEW YORK, N. Y., A CORPORATION OF NEW YORK.

MANUFACTURE OF VAPOR ELECTRIC APPARATUS.

No. 806,853.     Specification of Letters Patent.     Patented Dec. 12, 1905.

Application filed February 12, 1904. Serial No. 193,350.

*To all whom it may concern:*

Be it known that I, PERCY H. THOMAS, a citizen of the United States, and a resident of East Orange, county of Essex, State of New Jersey, have invented certain new and useful Improvements in Manufacture of Vapor Electric Apparatus, of which the following is a specification.

In vapor electric apparatus wherein one or more of the electrodes is of solid material it becomes necessary to remove from such electrodes the occluded gases which exercise a deleterious action on the life or operation of the completed apparatus. Such removal takes place during the manufacture of the apparatus, and it has been accomplished by making the solid electrode of such an apparatus temporarily a negative electrode, passing a current of high tension, and thereby heating the electrode sufficiently to remove the injurious gases. Recourse has also been had to the employment of supplemental heating means applied to the outside of the apparatus. During the operation of such manufacturing processes the resistance of the vapor-path between the electrodes is slight and the current has a free path through the apparatus between the electrodes.

I have found that the heating of the solid electrode for the purpose of driving off the vapors may be accomplished by other means—that is to say, through the proper regulation of the vapor-pressure within the apparatus. For example, in a vapor electric apparatus wherein the volatilizable electrode is of mercury I may apply heat in the neighborhood of the mercury electrode, and thereby generate an excess of vapor in the container of the apparatus, and by properly regulating the amount of vapor thus produced while the apparatus is still connected with a vacuum-pump I may produce such vapor conditions between the electrodes as will cause the current passing between them to heat the solid electrode while it is acting as a positive electrode. On the other hand, without the creation of an excess of vapor, as described, no sufficient heating of the positive electrode takes place.

The present invention therefore contemplates the development within the container of a high vapor-pressure by heat or other means and passing a current through the apparatus from the solid positive to the volatilizable negative electrode. Under such conditions if the vapor-pressure be properly regulated the heat appearing at the positive electrode is greatly increased, and in some instances the current instead of passing through the whole section of the container becomes narrowed down to a contracted path. The increase of heat at the positive electrode may be made sufficient to free the same from injurious gases. At the same time it is not necessary to employ excessive currents or electromotive force such as would be sufficient to break down the resistance of the solid electrode as the negative, and consequently the method herein described is an economical method of accomplishing the results which have been produced by other processes.

The drawing is a vertical section of an apparatus suited to carrying out my invention.

In the drawing, 1 is a tube or container having inclosed within it a solid positive electrode 2 and a volatilizable negative electrode 3. We may assume the positive electrode to be of iron and the negative electrode of mercury. An exit-tube 4 leads to a vacuum-pump 5 or other apparatus of the kind.

At 6 I show a generator connected to the lead-wires 7 and 8, which are joined, respectively, to the positive and negative electrodes 2 and 3.

A source of heat 9 may be located underneath the negative electrode 3, and when the source of heat is operating it will cause the generation of an excess of mercury-vapor inside the tube 1. When the proper degree of vapor-pressure has been reached in the tube, the circuit of the generator 6 may be closed and current made to pass from the solid positive electrode 2 to the negative electrode 3.

Under proper regulation, as above set forth, the current may be caused to pass through the apparatus and at the same time the positive electrode 2 may be caused to be heated sufficiently to drive out its occluded gases.

Other means besides heat for generating the excess of vapor in the apparatus may be employed. For example, the exhaustion of the apparatus may be stopped and maintained at a point giving a favorable pressure within the container, the treating, as referred, may be continued to the end, and the exhaustion afterward completed.

By applying alternating current to the treatment of the electrodes in an apparatus of this kind the electrode may be heated both by the positive and the negative impulses.

I may also take advantage of the fact that a relatively high vapor-pressure within the apparatus causes the current to flow in a constricted path to cause an effective removal of gases from the positive electrode. The constricting of the vapor-path causes also a restriction of the generation of heat upon the positive electrode to a portion of the same, causing an excessive generation of heat at this particular point and the consequent elevation of temperature and expulsion of gas. This point I have also found will shift with time, and ultimately the whole of a large electrode may thus be raised to a high temperature and freed from gas by the localized application of heat successively at different points upon the electrode.

I claim as my invention—

1. The method of removing injurious gases or vapors from an electrode inside a suitable container, which consists in making the said electrode a terminal of an electric circuit, passing current therethrough, and regulating the pressure of the vapor in the path between the said electrode and its coöperating electrode.

2. The method of removing injurious gases from an electrode in a gas or vapor electric apparatus containing two or more electrodes, which consists in passing electric current between the two electrodes and developing heat at the selected electrode by properly regulating the pressure of the gas or vapor between the electrodes.

3. The method of removing injurious gases from a solid electrode inside a gas or vapor electric apparatus containing two or more electrodes, which consists in passing current through the apparatus, and developing within the apparatus a high vapor density.

4. The method of creating a vacuum within a gas or vapor electric apparatus containing two or more electrodes, which consists in passing current between two of the electrodes, developing the proper degree of vapor-pressure within the apparatus, and exhausting the apparatus by any suitable means.

5. The method of removing injurious gases from a solid electrode inside a gas or vapor electric apparatus containing two or more electrodes, which consists in partially pumping the apparatus, developing heat at the selected electrode by properly regulating the pressure of the gas or vapor between the electrodes, and subsequently exhausting the apparatus.

6. The method of removing injurious gases from an electrode in a gas or vapor apparatus containing two or more electrodes, which consists in making the said electrode a terminal of an electric circuit, passing alternating current therethrough and regulating the pressure of the vapor in the path between the said electrode and a coöperating electrode.

7. The method of removing injurious gases from an electrode inside a gas or vapor electric apparatus containing two or more electrodes, which consists in developing within the apparatus a high degree of density, passing an electric current through the vapor, thereby localizing the heat at a certain point upon the electrode, and shifting the point of heat development over the whole electrode.

8. The method of removing injurious gases from an electrode in a gas or vapor electric apparatus containing two or more electrodes, which consists in passing electric current between the two electrodes and developing heat at the selected electrode by properly regulating the pressure of the gas or vapor between the electrodes, at the same time heating the said electrode as a negative electrode by applying thereto the negative impulses from an alternating-current source.

Signed at New York, in the county of New York and State of New York, this 6th day of February, A. D. 1904.

PERCY H. THOMAS.

Witnesses:
WM. H. CAPEL,
GEORGE H. STOCKBRIDGE.